United States Patent [19]

Ting et al.

[11] Patent Number: 5,054,831
[45] Date of Patent: Oct. 8, 1991

[54] PIERCING ELEMENT GRIPPING APPARATUS

[75] Inventors: Kuan-Chong Ting, East Brunswick; Gene A. Giacomelli, Milltown; David R. Mears, Belle Mead; Witold P. Kabala, New Brunswick, all of N.J.; Shou-Jin Shen, Shanghai, China; Steven E. Williamson, Levittown, Pa.

[73] Assignee: Rutgers University, Piscataway, N.J.

[21] Appl. No.: 335,109

[22] Filed: Apr. 7, 1989

[51] Int. Cl.⁵ .................. A01C 11/02; B25J 15/00; B25J 19/02

[52] U.S. Cl. ........................... 294/61; 294/907; 111/101; 111/104; 901/31; 901/46

[58] Field of Search .............. 294/61, 50.8, 50.9, 294/119.1, 907; 901/30–35, 39, 41, 46, 47; 111/101, 104, 105, 919; 47/901; 271/18.3

[56] References Cited

U.S. PATENT DOCUMENTS

| | | | |
|---|---|---|---|
| 2,604,351 | 7/1952 | Rose et al. | 294/61 |
| 3,191,982 | 6/1965 | Goalard | 111/101 |
| 3,288,513 | 11/1966 | Behrick | 294/61 X |
| 3,386,763 | 6/1968 | Ottaway et al. | 294/61 |
| 4,130,072 | 12/1978 | Dedolph | 111/105 X |
| 4,289,080 | 9/1981 | Penley | 111/105 |
| 4,408,414 | 10/1983 | Lehle et al. | 47/14 X |

FOREIGN PATENT DOCUMENTS

| | | | |
|---|---|---|---|
| 453216 | 12/1927 | Fed. Rep. of Germany | 294/61 |
| 1031868 | 7/1983 | U.S.S.R. | 294/61 |
| 8601975 | 4/1986 | World Int. Prop. O. | 111/101 |

Primary Examiner—Margaret A. Focarino
Assistant Examiner—Dean J. Kramer
Attorney, Agent, or Firm—Lerner, David, Littenberg, Krumholz & Mentlik

[57] ABSTRACT

A gripping apparatus has at least two elongated piercing elements which slide in elongated collars or sleeves between open retracted positions and closed gripping positions. The piercing elements define an angle and they move toward the vertex of the defined angle when they move from the open position to the closed position. The orientation of the piercing elements and their path of travel are such that objects are reliably and securely held when the piercing elements are in their closed positions and positively released when the piercing elements are in their open positions. A sensor may be provided with the gripping apparatus to sense the presence or condition of the gripped object. The gripping apparatus is especially useful in grasping the root masses of plants for transplanting purposes.

47 Claims, 11 Drawing Sheets

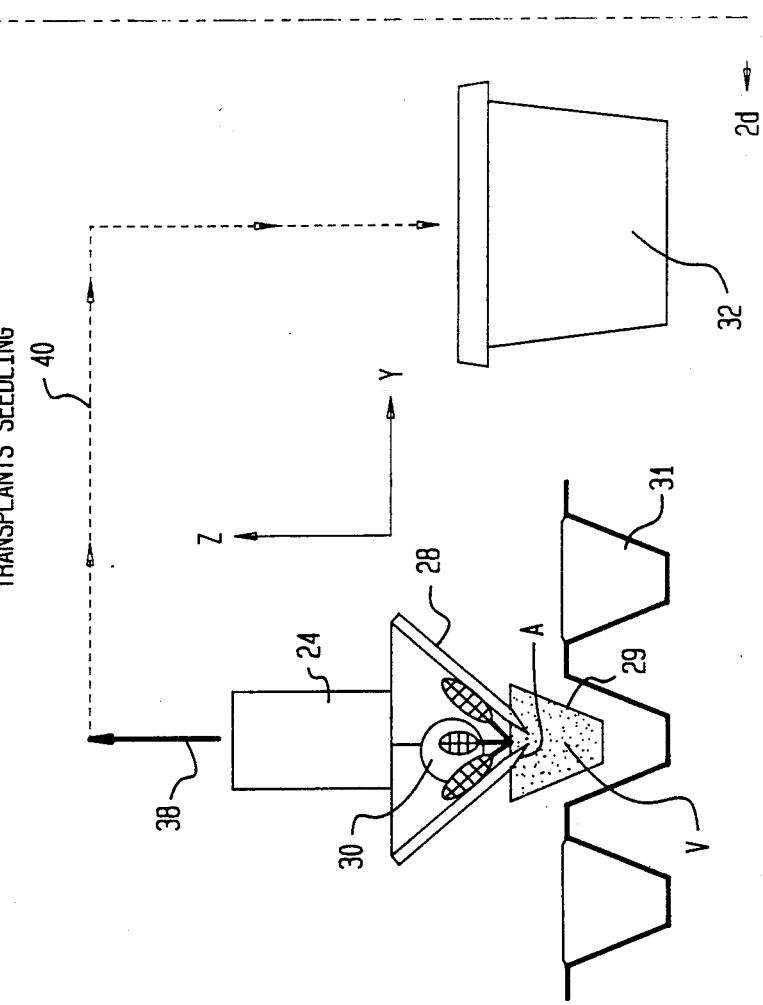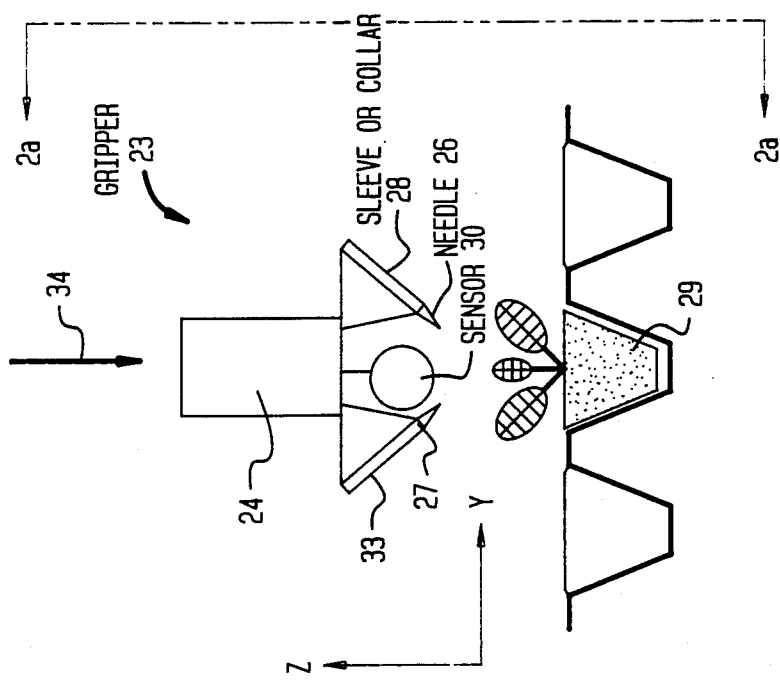

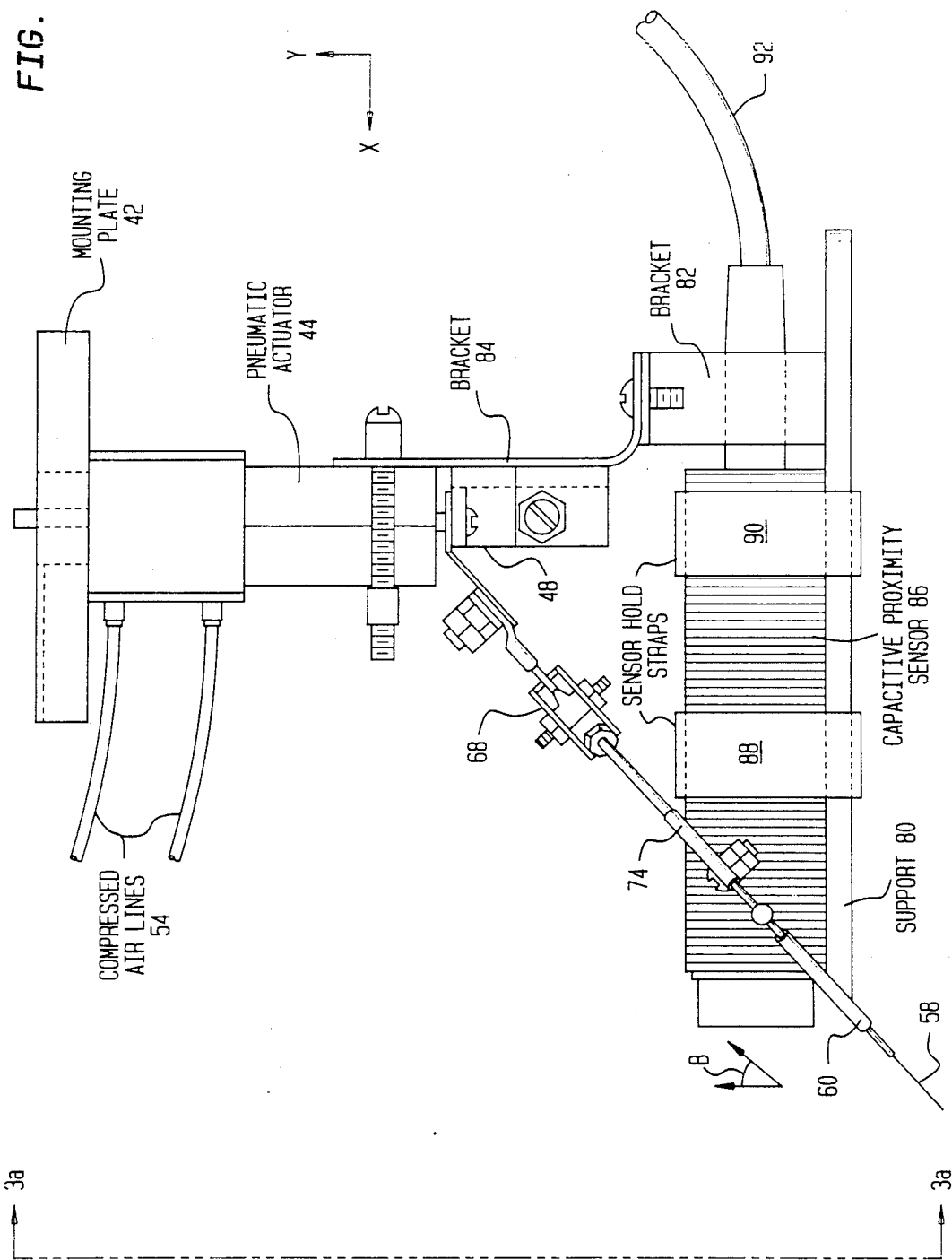

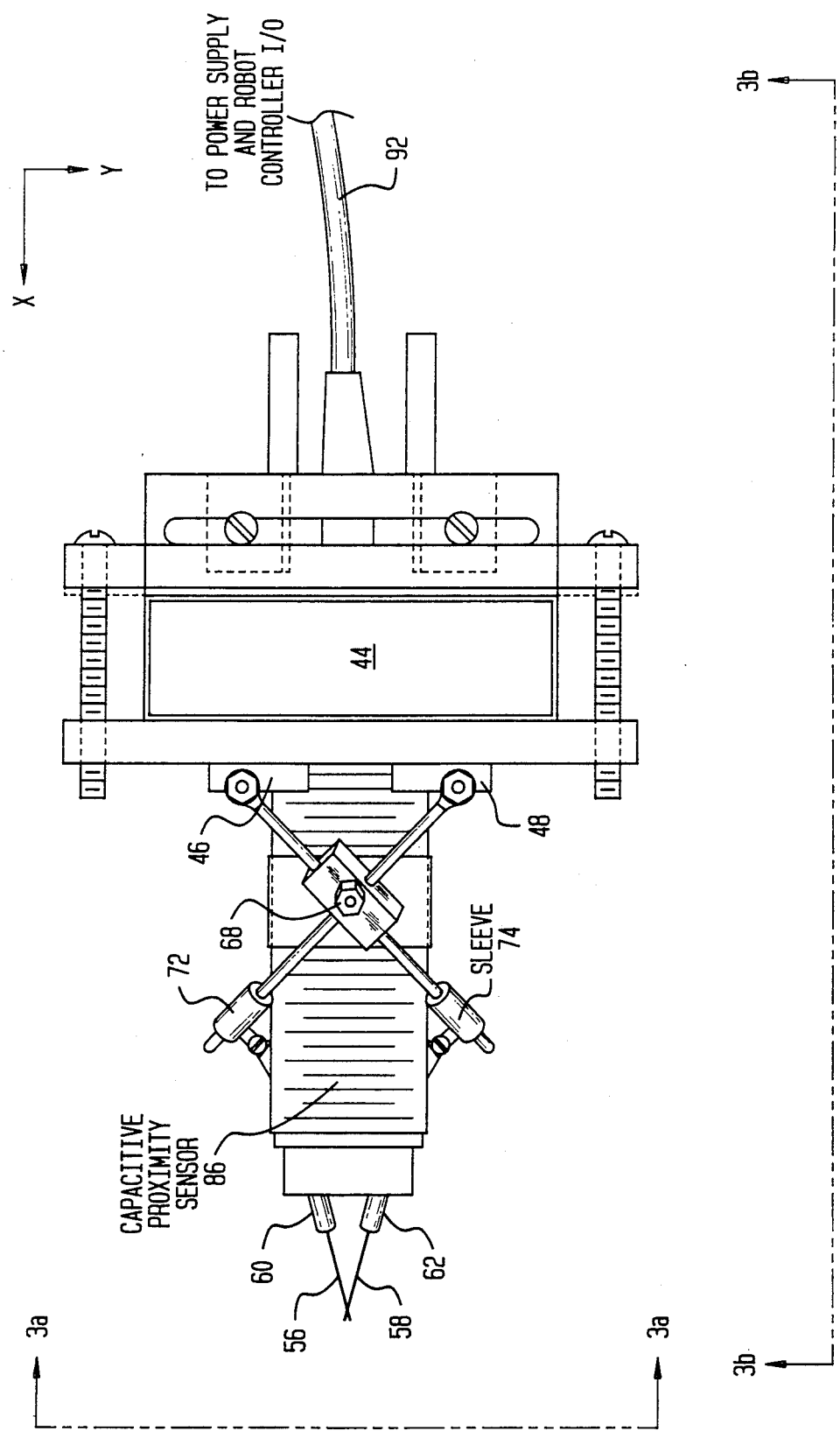

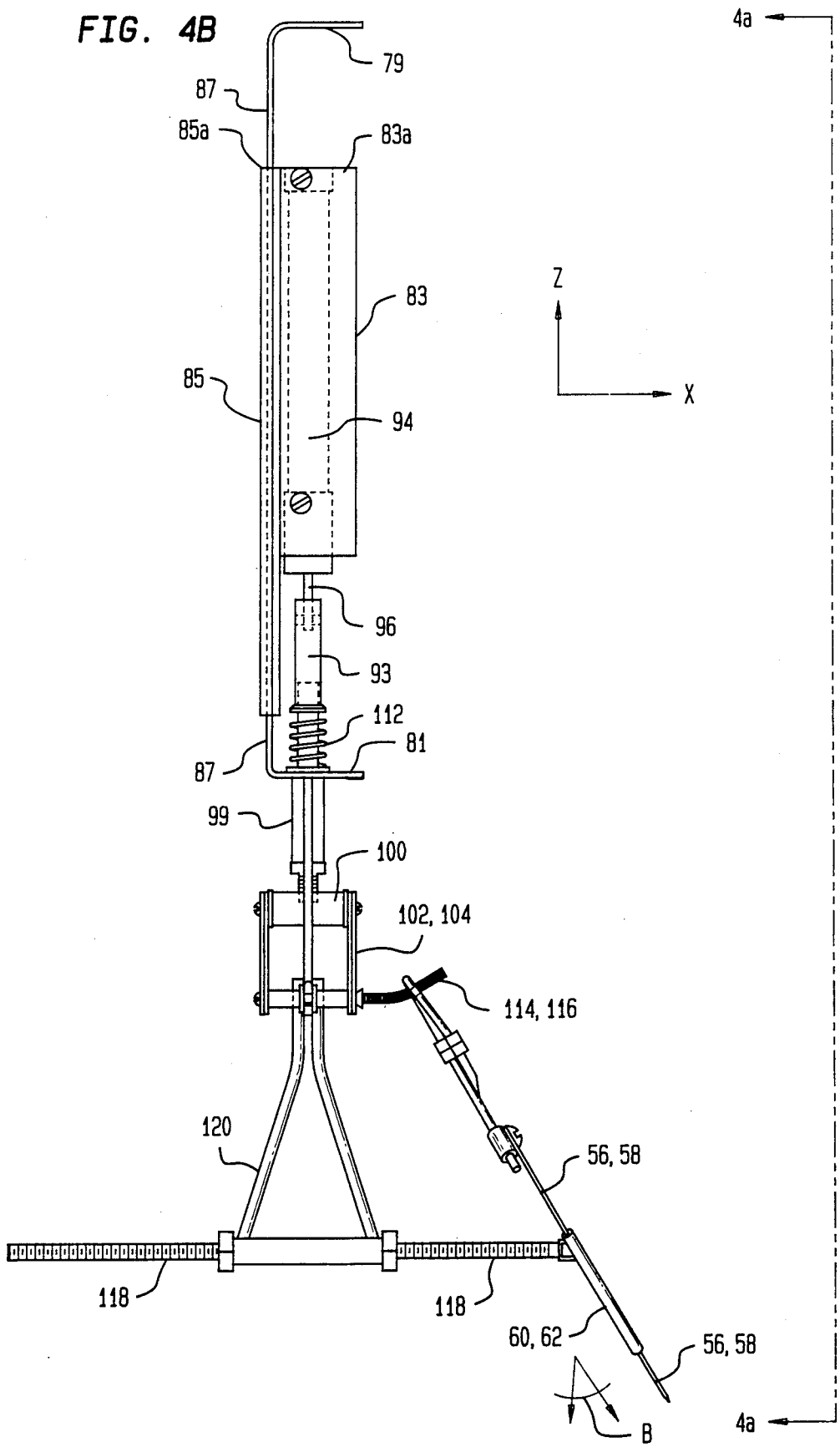

PIERCING ELEMENT GRIPPING APPARATUS

FIELD OF THE INVENTION

The invention of this application relates to an apparatus for gripping an object. The apparatus comprises a pair of elongated members or needles which pierce the object in such a manner that the object is securely held by the gripping apparatus. Although the gripping apparatus is useful in any situation involving objects that have surfaces which may be pierced, in a specific example of the invention, the gripping apparatus is useful for transplanting seedlings from one place to another in a greenhouse or other plant growing environment.

BACKGROUND OF THE INVENTION

In greenhouse plant production systems, seedlings are germinated in high density trays to effectively utilize the limited floor space in the greenhouse. Once the seedlings have achieved a certain level of maturity, they are transplanted into low density flats for further growth and development. In plug production systems, seedlings are normally germinated in plug trays having a large number of plug cells per unit area, for example, 20 cells per row and 30 rows on a tray measuring 334 mm. × 492 mm. × 12.7 mm. deep. After a certain growing period, the seedling plugs are then transplanted into growing flats at a lower density. For example, eight rows with six seedlings per row may be transplanted into a flat which is 350 mm. × 450 mm. × 50.8 mm. deep. There may be many variations in the dimensions of the plug trays and growing flats and in the density in which the seedlings are arranged.

Currently, the transplanting operation in most instances is a manual labor intensive task. In order to avoid the need for expensive manual labor in the greenhouse, various robotic systems have been investigated for automatically transplanting seedlings from high density plug trays to low density growing flats in an effort to reduce the cost of operating a greenhouse. Those robotic systems have manipulators with arms which are movable to desired locations in accordance with commands in a software program or robotic control mechanism. The arms may contain one or more joints connected by rigid members. Motion of the rigid members about each of the joints may be controlled by a computer or other electronic apparatus so that the end of the robotic arm may be positioned at a desired location.

One of the needs that has developed in connection with greenhouse automation is the need for an effective gripping mechanism, sometimes referred to as an end effector, attached to the end of a robotic arm for securely grasping a seedling so that it may be moved or transplanted to another location. Various kinds of gripping mechanisms have been proposed, but all have proven to be unsatisfactory for the purposes of transplanting seedlings in an automated growing environment. They have proven unreliable in grasping and releasing the seedlings, they have tended to damage or deform the seedlings, and they have not been able to adapt their operation to the varying size and shape of the seedlings. In addition, proposed end effectors, which are attempts to deal effectively with all these problems, are too complicated and expensive.

For example, end effectors which grasp the leaves and stems of the seedlings have been proposed, but these end effectors are not always able to pick up a given seedling and they are subject to the possibility of damaging the plant. See Hwang et al., "A Robotic Pepper Transplanter", *Applied Engineering in Agriculture*, Vol. 2, No. 1, pp. 2-5, 1986.

End effectors for grasping the root structure of the seedlings have also been proposed. In one example of these arrangements, a pair of parallel flat fingers is inserted into the root structure of the seedling and, to hold the seedling on the end effector, the fingers are moved toward one another while the fingers remain parallel. The seedling is released by moving the fingers apart and withdrawing them from the root structure. This apparatus requires careful alignment and may damage the root structure by compressing it too much. Also, when the seedling is released into a growing flat or pot to complete the transplanting process, the soil in the growing flat or pot is pushed away from the root structure due to the separation of the fingers needed to release the seedling. What may be left in essence is a seedling with crushed root ball in an open hole, when in fact it is more desirable to have the soil in the flat or pot in intimate contact with the seedling around the entirety of a relatively undeformed root ball. See Kutz et al., "Robotic Transplanting of Bedding Plants", *Transactions of the ASAE*, Vol. 30 No. 3, pp. 586-590, 1987.

Fully instrumented parallel jaw grippers, some with an integrated servo tactile sensing capability, have been developed, but these grippers are too expensive and complicated for commercially viable operations. See Irwin, "An Integrated Servo/Tactile Gripper for Small Parts Assembly", *Robots 12 and Vision '88 Conference Proceedings*, June 5-9, 1988, Vol. 2, pp. 15:1-15:11.

There has been some patent literature dealing with gripping apparatus for various pierceable articles, such as plants.

Ball et al. U.S. Pat. No. 4,688,837 refers to a robotic end effector which has a pair of outwardly slanted needle gripping devices which grasp and stretch a textile article by moving further outward as they pierce the article. Such an end effector is incapable of grasping an article such as a seedling or similar article.

Disston U.S. Pat. No. 3,602,542 refers to a weeder which has a group of slanted tines to be inserted around a weed to be removed from the ground. The tines are oriented so that a weed may be withdrawn from the ground and separated from as much of the surrounding soil as possible, resulting in an apparatus totally unsuitable for transplanting and like activities. Shredl U.S. Pat. No. 3,596,966 and Fuchs U.S. Pat. No. 3,663,050 refer to other weed removing tools. Behrick U.S. Pat. No. 3,288,513 refers to gaff hook for holding, catching, and retrieving wildlife. Poll U.S. Pat. No. 2,960,944, Armstrong et al. U.S. Pat. No. 4,355,588, Ellis U.S. Pat. No. 4,408,550, deGroot U.S. Pat. No. 4,750,439, and Shaw U.S. Pat. No. 4,788,920 refer to various plant grippers used in planting and transplanting mechanisms which squeeze a large part of a plant between two gripping members. None of these are suitable for automating a transplanting operation because there is a significant chance of plant damage. They also are unable to conveniently accommodate differing size and shape plants without one or more of damage to the plants, an insecure grip on the plants, and a lack of guaranteed release of the plants.

This literature is evidence that over a long period of time many efforts have been made to design a successful gripper mechanism, all involving significant problems.

Accordingly, there has been a long felt but unsatisfied need for a gripping apparatus or end effector which avoids the problems outlined above. In satisfaction of this long felt need, Applicants have invented a gripping apparatus which substantially avoids the problems attending the prior gripping apparatus and end effectors.

One object of the invention is to provide a gripping apparatus which is able to reliably pick up an object and reliably release that object.

Another object of the invention is to provide a piercing type gripping apparatus which involves minimal deformation of, and damage to, the gripped object.

An additional object of the invention is to provide a gripping apparatus capable of gripping objects which have different sizes and shapes.

It is another object to provide a particularly suitable apparatus for gripping plants, specifically, the root masses of the plants.

It is yet an additional object of the invention to provide a gripping apparatus which is particularly suited for use in a robotic transplantation apparatus.

It is also an object of the invention to provide a gripping apparatus which substantially avoids the problems of prior gripping apparatus.

Other objects and advantages of the invention are either specifically identified elsewhere in the application or are apparent from that description if not specifically identified.

Applicants have published some information (which does not constitute prior art) about the invention and technology associated with the invention. See (1) Ting et al., "Robot Work Cell Development for Seedling Transplanting", Paper No. 88-1027, presented at the June 26-29, 1988 meeting of the American Society of Agricultural Engineers, (2) Ting et al., "A Robot for Transplanting Plugs", *Greenhouse Grower*, November 1988, pp. 58-59, and (3) Ting et al., "End-Effector Development for Robotic Transplanting of Seedlings", Paper No. 88-1544, presented at the Dec. 13-16, 1988 meeting of the American Society of Agricultural Engineers. Applicants incorporate by reference the entirety of the disclosure of these three publications into this application.

SUMMARY OF THE INVENTION

The invention of this application involves a gripping apparatus which has a pair of elongated gripping elements oriented in a specific fashion and movable along a specified path between respective open positions and respective gripping positions. The Detailed Description of the Invention section of this application contains detailed descriptions of specific examples of the invention. The claims at the end of this application specify the scope of the invention.

BRIEF DESCRIPTION OF THE DRAWINGS

FIGS. 2c and 2d show front views of the end effector approaching a plug tray with its needles in their open positions (FIG. 2c) and receding from the the plug tray with needles in a grasping position after having grasped a seedling (FIG. 2d).

FIGS. 3a–3c are front, side, and top views, respectively, of a gripping apparatus in accordance with the invention of this application having a single linear actuator driving a pair of needles between open positions and grasping positions and also having a presence or condition responsive sensor. FIGS. 3a–3c show the needles in their grasping positions.

FIGS. 4a and 4b are front and side views, respectively, of another example of a gripping apparatus in accordance with the invention of this application having two needles driven by a single actuator.

DETAILED DESCRIPTION OF THE INVENTION

Figure 1A:
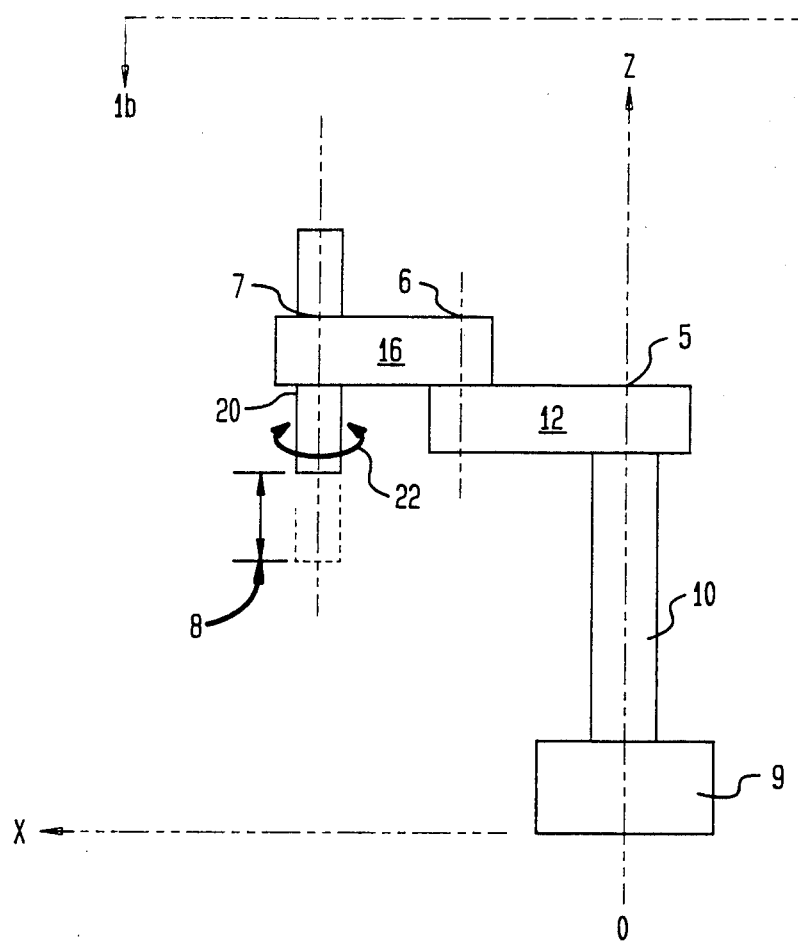
FIGS. 1a and 1b are side and top views, respectively, of an example of a robotic manipulator which can be used with a gripping apparatus or an end effector in accordance with the invention of this application.

The examples of the invention described here are gripping apparatus having two, and possibly more, elongated piercing elements, such as slender needles, slideable in slanted collars or sleeves for gripping an object. An actuating mechanism is able to cause the piercing elements to move from an open retracted position in which the elements are retracted into the collars and in which they do not grasp an object to a closed grasping position in which the piercing elements are extended from the collars and in which the piercing elements are capable of grasping and holding securely an object which has been pierced by the elements. The actuating mechanism also is able to cause the piercing elements to move from the grasping position to the open position. Any object held by the piercing elements is positively and reliably released by the retraction of the piercing elements into the collars.

The actuator may be any known pneumatic, hydraulic, electric, magnetic, or electromagnetic actuator which can propel the piercing elements along the desired path through the collars. The actuator may be a pneumatic actuator, such as a Model RP-100 pneumatic actuator made by Robohand of Easton, Conn.

The actuator may also be a single acting fluid actuated cylinder and piston assembly with spring return or a double acting fluid actuated cylinder and piston assembly. In the case of a single acting assembly, application of pressurized fluid to the assembly causes a piston rod associated with the assembly to move from a starting position to execute a stroke in a given direction. Removal of the pressurized fluid from the assembly allows a spring in the assembly to return the piston rod to the starting position from which the stroke was executed. The single acting fluid actuated cylinder and piston assembly may be either the fluid extend and spring retract type or the fluid retract and spring extend type. In the case of a double acting cylinder and piston assembly, there is no spring return. Selective application of pressurized fluid to certain parts of the cylinder causes the piston rod to execute a stroke in a given direction from a starting point and also to return the piston rod to its starting point. One example of a suitable fluid actuated cylinder and piston assembly which may be used as an actuator in the gripping apparatus is a Clippard SM-3-4 pneumatic cylinder.

There may be a separate actuator for each elongated element or there may be a single actuator connected to both elongated elements. If necessary, an appropriate mechanical arrangement is provided between each actuator and the elements to which it is connected so that the normal motion of the actuator may be converted into the desired motion of the elements.

The gripping apparatus picks up an object by the elongated elements penetrating the surface of the object and positively releases the object by retracting the elongated elements into their collars. Any object picked up is securely held because of the particular orientation and line of travel of the piercing elements. Any object is positively released because the withdrawal of the needles along non-parallel paths insures that the object cannot stick to one of the needles. Positive release is further ensured because the collar forces the object from the elongated element when the elongated element is retracted into the collar.

The described gripping apparatus may be used as an end effector on a robotic or automatic device or as a mechanical tool in a fixed location automation apparatus. A sensor, for example, a capacitive proximity sensor, may be provided on the gripping apparatus to detect the presence or condition of an object in the gripping apparatus. A means for directing input signals to the sensor, such as an electrical power source, and a means for processing output signals from the sensor, such as a robot controller or computer, may be provided.

The gripping apparatus may grasp any object having a penetrable surface. One particularly appropriate application of a gripping apparatus in accordance with the invention is to handle plant seedlings during robotic or other mechanical transplanting procedures. The size of the gripping apparatus may be scaled up or down, and the configuration of the parts of the gripping apparatus may be set, for handling various sizes and shapes of objects, for example, potted plants or gel coated embryos. Other possible uses for gripping apparatus in accordance with the invention include uses in the food industry, tissue culture operations, biotechnology, medical, or chemical laboratories, and other areas.

The gripping apparatus may be used on any type of transporting or positioning apparatus, such as a robot or fixed location automation systems. Once the gripping apparatus has been positioned adjacent the object to be picked up, or the object has been positioned adjacent the gripping apparatus, the elongated elements are simultaneously thrust out of the collars toward the interior of the object, in some examples of the invention, along radial lines. Once the elongated elements have penetrated the object to a desired depth, the gripping apparatus and object may be transported by a manipulator, or other mechanism to which the gripping apparatus is connected, to a desired destination. When the object has been transported to its destination, it can be removed from the gripping apparatus by retracting the elongated elements into the collars.

The sliding needles in collars are structurally simple, yet have quick positive actions for grasping and releasing. The gripping apparatus may be constructed with off the shelf components and conventionally machined metal parts assembled with simple hand tools.

One major application of the described apparatus is in transplanting seedling plugs from relatively high density plug trays into lower density growing flats. As alluded to above, the transplanting operation is a manual labor intensive task in present day commercial bedding plant and vegetable crop production systems, which at present involve the transplanting of billions of plants every year. The bottleneck in automating such operations is the lack of an effective gripping apparatus which is able to handle irregularly shaped seedlings of various sizes. The present gripper technology for transplanting uses passive, parallel flat blade type fingers supposedly comparable to a human hand. The piercing element gripping apparatus in accordance with the invention of this application has several advantages over the current technology, as follows: (1) there is positive action in both picking up and releasing; (2) there is non-deformation and minimum damage to the seedlings; (3) the operation of the gripping apparatus is relatively independent of, and not influenced substantially by, seedling size and shape; (4) the gripping apparatus is easily adaptable to other kinds of objects; (5) the gripping apparatus conveniently grasps the root mass of seedlings located and organized in a conventional plug tray used by the industry; and (6) extraction of a number of plugs from the plug tray and separation of the individual plugs in preparation for transplanting is rendered unnecessary.

Figure 1B:
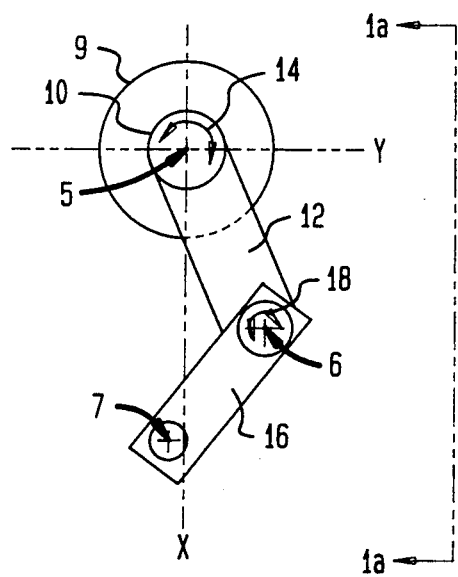

FIGS. 1a and 1b show an example of a robotic manipulator with which the gripping apparatus in accordance with the invention may be used. It comprises a base 9 and a support member 10 which is connected to one end of a rigid member 12 at a pivot point 5. The rigid member 12 is rotatable about the axis of the support, as indicated by an arcuate arrow 14 in FIG. 1b. One end of rigid member 16 is connected to another end of the rigid member 12 at a pivot point 6. The rigid member 16 is rotatable about an axis passing through the pivot point 6, as indicated by the arcuate arrow 18 in FIG. 1b. The other end of the rigid member 16 is connected to a wrist mechanism 20 at a pivot point 7. The nature of the pivot point 7 is such that the wrist mechanism is rotatable about an axis passing through the pivot point 7, as indicated by an arcuate arrow 22 shown in FIG. 1a. The pivot point 7 is also such that the wrist mechanism is movable vertically, as indicated by the phantom representation of the wrist mechanism and the vertically oriented arrow labeled 8 shown in FIG. 1a.

Controlled motive means is associated with each of the rigid members and pivot points so that the various components of the manipulator may be positioned in a desired manner, specifically, so that anything attached to the wrist mechanism may be brought to a desired position in a three dimensional space about the manipulator. An example of a robotic manipulator like the one shown in FIGS. 1a and 1b is a selective compliance assembly robot arm (SCARA) manipulator, Model AdeptOne, made by Adept Technology, Inc. of San Jose, Calif.

For convenient description of the orientation of the apparatus shown in the drawings, arrows labeled x, y, and z are shown in the drawings to identify three mutually perpendicular coordinate directions in the space around the manipulator in FIGS. 1a and 1b and in the space around the gripping apparatus in the other drawings. Distances in the directions indicated by the x, y, and z arrows may be referenced to any arbitrary origin point, such as the point labeled "0" in FIG. 1a.

A gripping apparatus, sometimes referred to as an end effector when attached to a robotic arm, is attached to the wrist mechanism of the manipulator shown in FIGS. 1a and 1b. The end effector comprises the interface between the robotic manipulator and the task to be performed.

FIGS. 2a–2d show the motions made by a gripping apparatus in accordance with the invention of this application in picking up a seedling from a container, such as a plug tray, containing a relatively high plant density and in depositing the picked up seedling in another container, such as a growing flat or pot, containing a relatively lower plant density. The gripping apparatus 23 is suspended from the wrist 20 of the manipulator and comprises an actuator 24 connected by way of suitable mechanical means to a pair of elongated piercing elements in the form of sharp pointed needles 26 and 27. In this example of the invention, the needles are coplanar and the lines of elongation of the needles form an acute angle A, which may be in the range of about 20 degrees to about 90 degrees. The plane of the needles is non-vertical, forming an angle B (shown in FIG. 3b) with y-z planes, which angle may be in the range of about 0 degrees to about 80 degrees. These angles are selected so that the needles are properly positioned for entry into the object being picked up and the object is securely held when the needles have been inserted into the object, and is positively released when the needles are withdrawn from the object.

The needles are situated substantially concentrically in collars or sleeves 28 and 33. The actuator is capable of causing the needles to slide in the sleeves along the lines of elongation of the needles, between a first open position illustrated in FIG. 2c and a second gripping position illustrated in FIG. 2d. The needles move toward the vertex V of the angle they form and thus are closer together in the gripping position, which causes an object which has been penetrated to be securely held by the needles in that position.

The needles do not have to be coplanar as they have been shown in the apparatus of FIGS. 2a–2d. They may, for example, lie in parallel y-z planes spaced apart in the x-direction or they may take on other orientations which permit reliable and secure grasping of an object when the piercing elements are moved from the open position to the closed position and a positive release of that object when the piercing elements are moved from the closed position to the open position. All that is necessary is that the needles be oriented such that they define an angle in some plane. The needles, or projections of the needles into the plane, approach the vertex of the angle as they move from their open positions to their closed positions. If the needles are coplanar, the angle is in the plane of the needles and is the included angle between the needles. If the needles are not coplanar, then there is at least one plane in which projections of the needles form an angle and the projections of the needles move closer to one another by moving toward the vertex of the angle in moving from the open to the closed position.

Figure 2A:
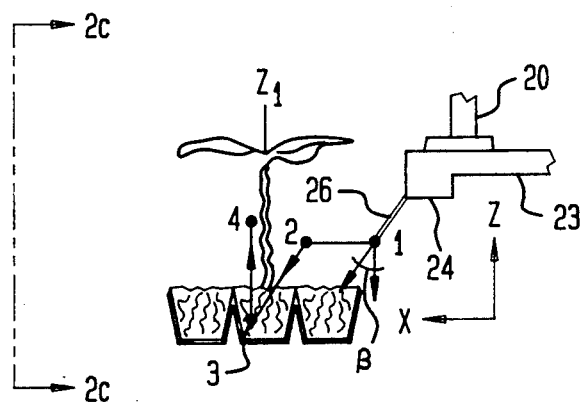
FIGS. 2a and 2b are side views of the paths taken by an end effector in accordance with the invention of this application in picking up a seedling from a plug tray (FIG. 2a) and depositing the picked up seedling in a growing flat (FIG. 2b).
Figure 2B:
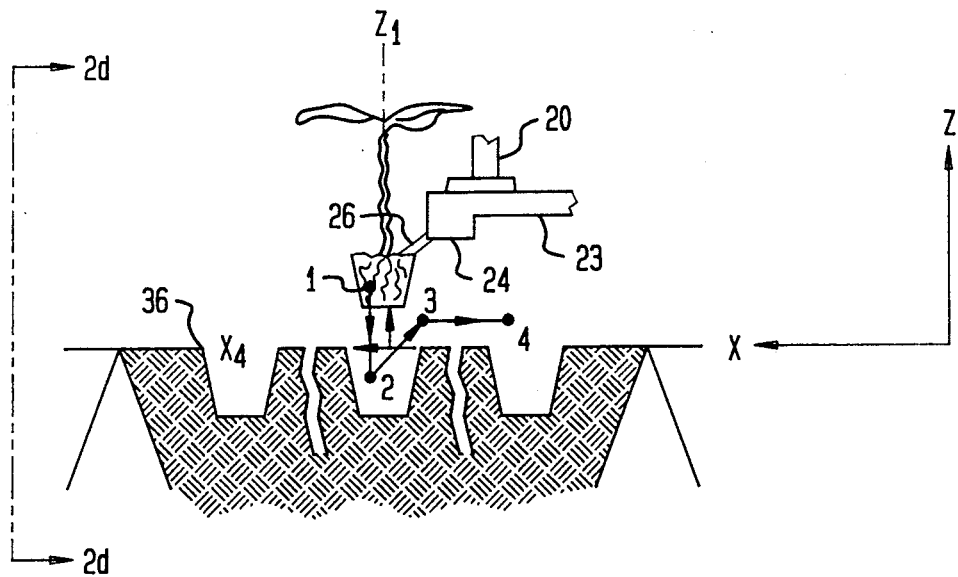

The gripping apparatus of FIG. 2a–2d operates as follows. First, the gripping apparatus is moved to the neighborhood of a seedling plant 29 situated in a plug tray 31. This motion is carried out by the manipulator as needed, for example, by a combination of vertical and horizontal moves indicated by arrow 34 in FIG. 2c and the arrow connecting the dots 1 and 2 in FIG. 2a. After the necessary moves have been made, the needles are moved from their open position, retracted into their respective sleeves or collars, to a closed or grasping position, extended from the collars or sleeves, so that the needles are inserted into the root zone of the seedling, as shown in FIG. 2d and by the arrow from dot 2 to dot 3 in FIG. 2a. The seedling is then lifted from the plug tray by the manipulator as shown by the arrow from dot 3 to dot 4 in FIG. 2a and the arrow in FIG. 2d. As shown by the arrows 40 in FIG. 2d and the arrows connecting dots 1–4 in FIG. 2b, the manipulator then moves and transplants the seedling to a larger pot 32 shown in FIG. 2d or growing flat 36 shown in FIG. 2b. When the manipulator has properly positioned the gripping apparatus with respect to the pot or growing flat, the gripping apparatus is caused to release the seedling by the actuator retracting the needles into the collars and out of the root mass. Since the collars have a diameter which is greater than that of the needles, the diameter of the collars is greater than that of the holes in the root mass created by the penetration of the needles into the root mass. This greater diameter forces the root mass off the needles as the needles are retracted into the collars, so that the seedling is positively and reliably released.

As shown in FIGS. 2c and 2d, the gripping apparatus may contain a presence or condition sensor 30 which is positioned in the gripping apparatus so as to sense the presence or condition of the object being grasped by the gripping apparatus. The sensor may be a capacitive proximity sensor, such as a Pepperl and Fuchs, Inc. capacitive proximity sensor, Model No. CJ10-30GM-E2. The sensitivity of the sensor may be set so that the output signal of the sensor indicates whether or not an object has been picked up by the gripping apparatus. This information is useful in preventing wasted time and inefficient transplanting operations in that the manipulator will not make needless trips to the growing flat or pot when there is no viable seedling at the pick up location or when it mistakenly believes that it is delivering a seedling which in fact the gripping apparatus has failed to pick up. Once the sensor indicates that the gripping apparatus has failed in an attempt to pick up a seedling from the plug tray, the gripping apparatus can immediately be instructed to try again, either at the same location in the plug tray or at the next location, without making a useless trip to the growing flat without a seedling. The sensitivity of the sensor may also be set so that the condition of any seedling that has been picked up may be determined. The capacitive proximity sensor mentioned above has been proven capable of producing signals related to the moisture content of a picked up seedling. Too low a moisture content can be taken as an indication that the seedling is unhealthy or dead. The manipulator can then be instructed in light of such an indication to discard the seedling instead of transplanting it.

FIGS. 3a–3d show a detailed example of a gripping apparatus in accordance with the invention. The gripping apparatus includes a single linear pneumatic actuator connected to a pair of piercing elements through a scissors mechanism, which converts the linear motion produced by the actuator to simultaneous motion of non-vertical, coplanar, and non-parallel piercing elements located for sliding motion in collars. The motion of the piercing elements is along two lines of elongation of the elements forming an angle in the space about the gripping apparatus.

The apparatus of FIGS. 3a–3d comprises a mounting plate 42 which may be connected to a manipulator, such as a wrist mechanism associated with a robot arm. A pneumatic actuator 44 is connected to the mounting plate 42 and may be the Robohand actuator referred to above. The actuator has two actuating elements 46 and 48 which are caused to move linearly as a result of selective application of compressed fluid, such as compressed air, to the actuator by way of fluid lines 54. The actuator causes the actuating elements to move horizontally toward one another, as indicated by arrows 50, or away from one another, as indicated by arrows 52.

A scissors mechanism causes needles 56 and 58 to slide in collars 60 and 62 along the lines of elongation of the needles and the collars. Specifically, when the actuator causes the actuating elements to close toward one another, the scissors mechanism causes the needles to be extended from the collars into a position for grasping an object located with respect to the needles so that the object is pierced by the needles as they are extended from the collars. Note the condition of the apparatus shown in FIGS. 3a–3c. When the actuator causes the actuating elements to open and travel away from one another, the scissors mechanism causes the needles to be retracted into the collars in a position for releasing an object which had been impaled on the needles. Compare FIG. 3d h FIGS. 3a–3c.

The scissors mechanism comprises a pair of rods 64 and 66 connected to the actuating elements 48 and 46, respectively, as shown. The rod 64 is connected to a sliding pivot point 68 on a sleeve 70 which is positioned to slide on rod 66. Rods 64 and 66 slide in sleeves 72 and 74, respectively. The sleeves 72 and 74 have additional sliding pivot points 76 and 78, respectively, to which are connected the needles 56 and 58. As is apparent to those skilled in the mechanical arts, when the actuating elements open and close, the needles will be caused, through the agency of the scissors mechanism in FIGS. 3a–3c, to retract and extend, respectively, from their associated collars 60 and 62.

The collars 62 and 64 are fixed to a support 80 which is suspended from the pneumatic actuator. The support is attached to the actuator by way of brackets 82 and 84. The collars thus are substantially fixed with respect to the actuator. A capacitive proximity sensor 86, such as the Pepperl and Fuchs sensor referred to above, is secured to the support 80 by way of the illustrated sensor hold straps 88 and 90. The sensor is located so that the output signals from the sensor are such that the sensor is capable of indicating the presence of a seedling impaled on the needles and the condition of that seedling, such as its moisture content. The output signals from the sensor are transmitted to a robot controller via cable structure 92. As indicated in FIGS. 3b and 3c, power to the sensor may be transmitted along the same cable structure.

FIGS. 4a–4d show a modification of the FIGS. 3a–3d apparatus. FIGS. 4a–4d deal with an apparatus having one double acting cylinder and piston assembly 94 connected to a linkage which translates the linear motion of a piston rod 96 driven by the assembly 94 in a direction indicated by arrows 98 into a simultaneous motion of a scissors mechanism and a pair of needles like the motion produced by the actuating elements 46 and 48 and the scissors mechanism in FIGS. 3a–3c. The same motion of the piston rod also raises the entire gripping apparatus and thereby lifts a plant impaled on the gripping elements out of its container.

Figure 3A:
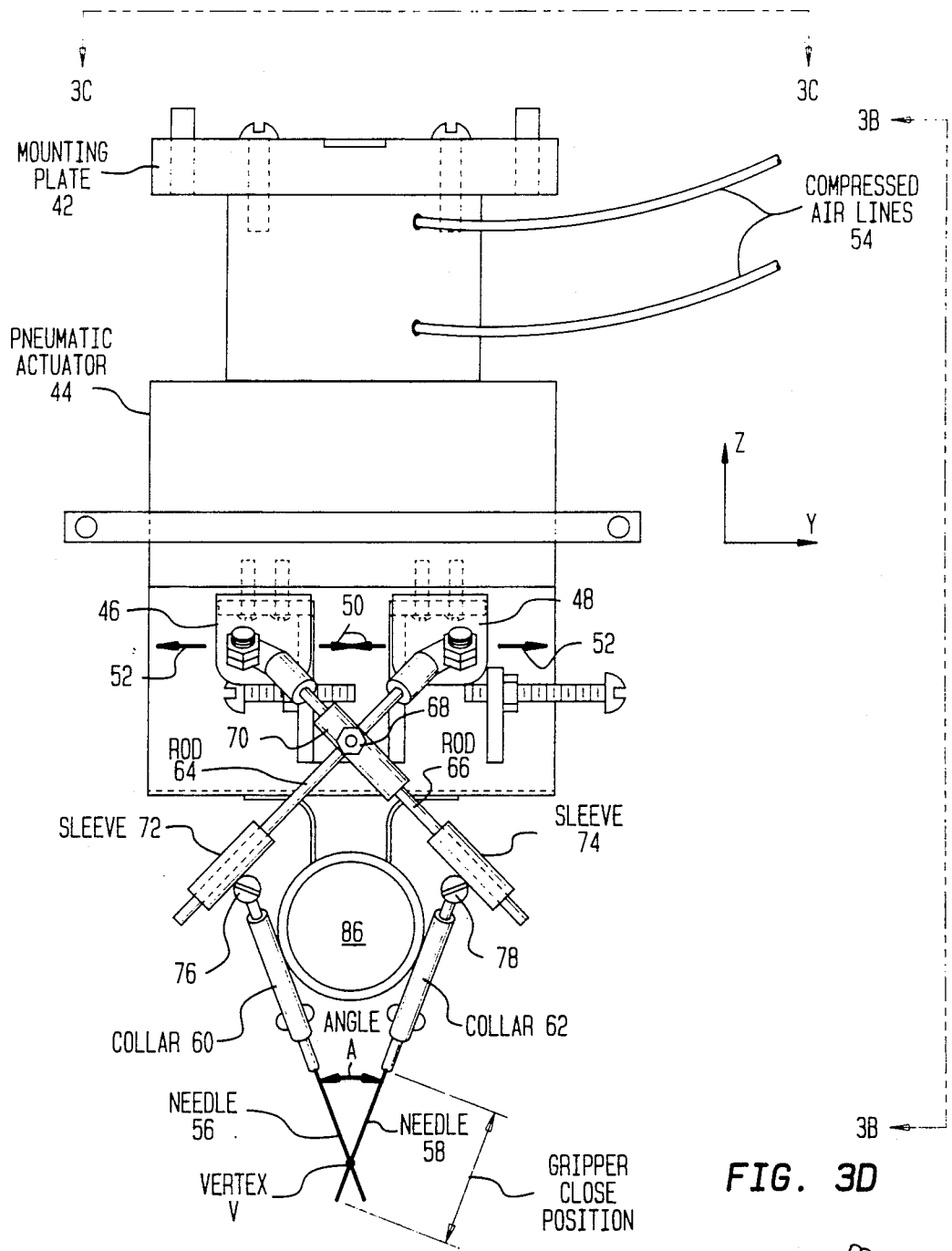
Figure 3D:
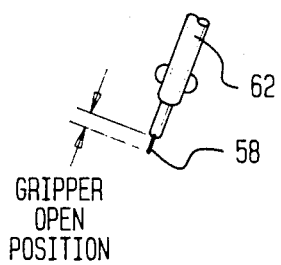
FIG. 3d shows the appearance of one of the needles in the FIGS. 3a–3c apparatus in its open position.
Figure 4A:
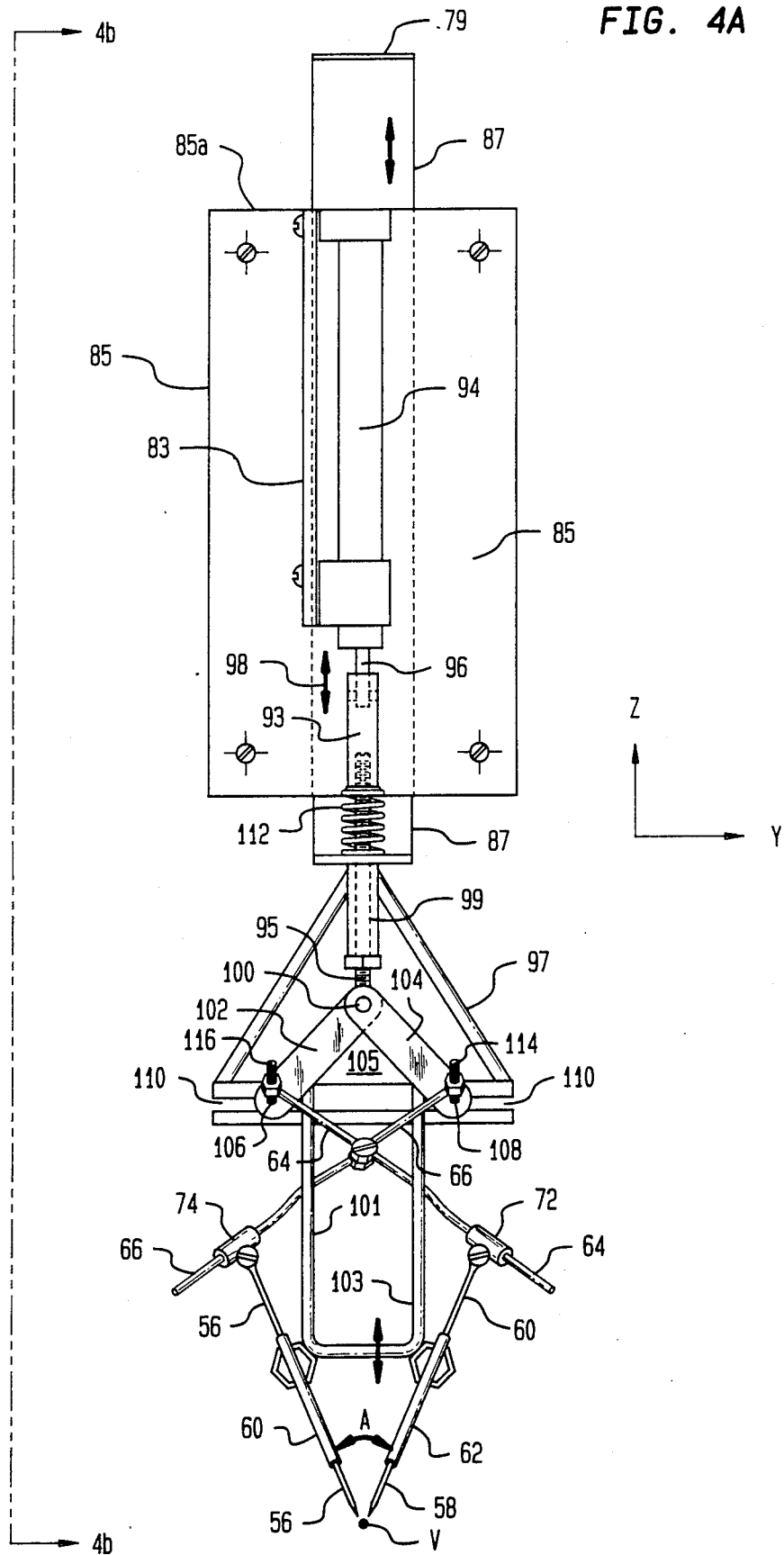
Figure 4C:
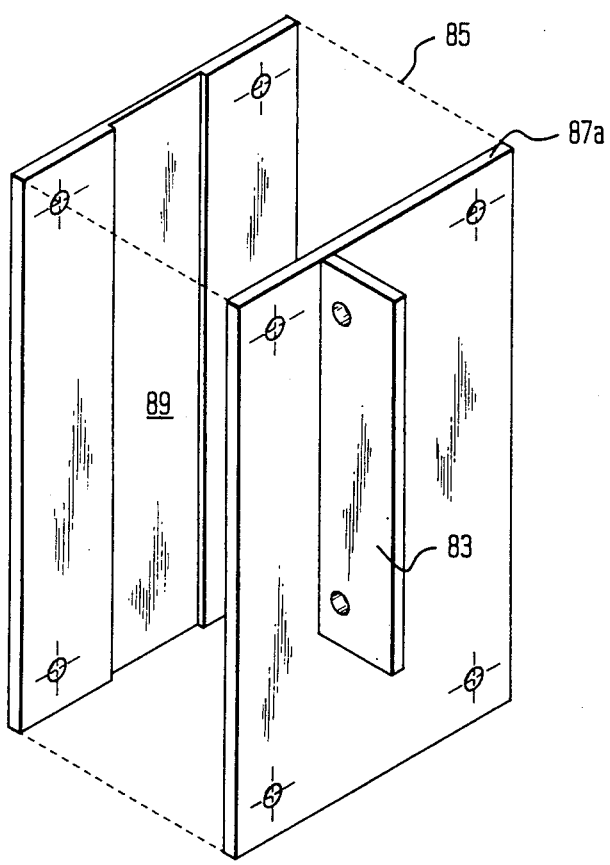
FIGS. 4c and 4d are perspective views of some of the parts in the apparatus of FIGS. 4a and 4b.

In FIGS. 4a and 4b, the piston rod 96 is connected to a pivot point 100 by way of a cylindrical connecting element 93 and a threaded rod 95. The piston rod 96 is inserted in one end of the connecting element 93 and held in place with set screws extending through the side of the connecting element. The other end of the connecting element is fixed to the threaded rod 95 which is screwed into a threaded opening in the end of the connecting element. One of the ends of each of a pair of links 102 and 104 is also connected to the pivot point 100. The other ends of the links 102 and 104 are connected to sliding pivot points 106 and 108 which are constrained to slide horizontally in slots 110. A scissors mechanism substantially like the one shown in FIGS. 3a–3c is connected to sliding pivot points 106 and 108 and the needles 56 and 58 which slide in collars 60 and 62.

Figure 4D:
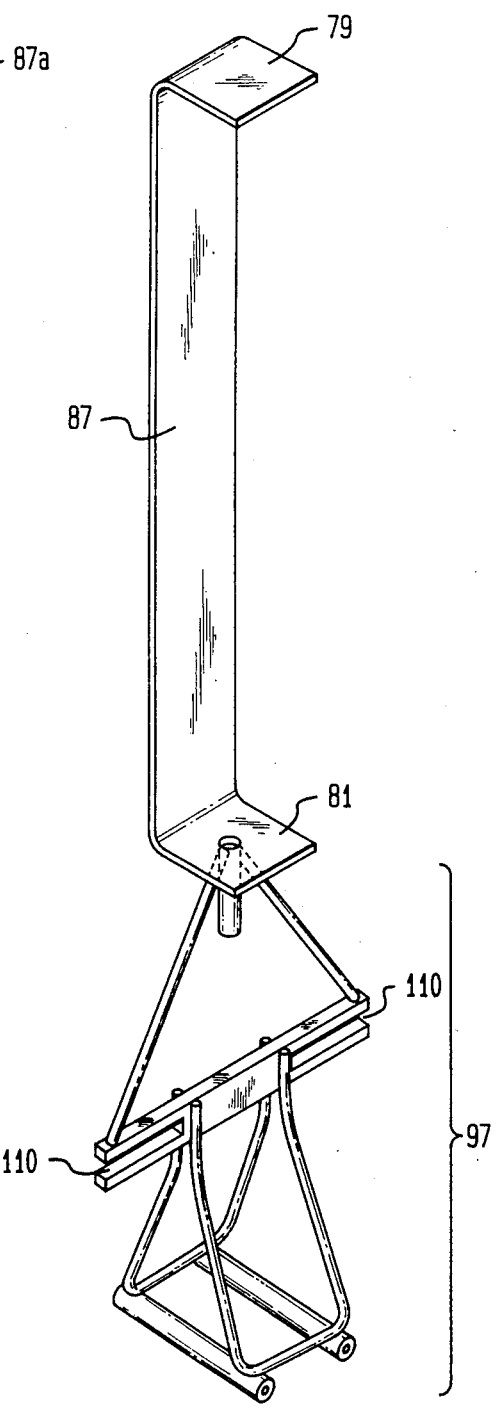

The piston and cylinder assembly 94, which may be a Clippard 3BDS-2 double acting pneumatic cylinder, is fixed to a bracket 83 on a mounting structure 85. The mounting structure is shown in a perspective exploded view in FIG. 4c. The mounting structure may be fixed to a stationary part of the greenhouse and containers of seedlings may be moved to the gripper on some sort of conveyor, or the mounting structure may be fixed to a moving conveyor and the gripping apparatus may be moved to selected stationary containers of seedlings or containers of seedlings on an independently moving conveyor. A C-shaped metal bracket 87, shown in perspective view in FIG. 4d, is slideable vertically in a channel 89 formed in the mounting structure 85. The bracket 87 is slideable between limits of travel defined by (a) a top portion 79 and a bottom portion 81 of the bracket 87 reaching the top surface 83a of the bracket 83 and the top 85a of the mounting structure 85 and (b) the bottom portion 81 reaching the bottom of the mounting structure 85, respectively. A frame 97 is attached to the bottom portion 81 of the bracket 87, as most clearly shown in FIG. 4d. The frame 97 supports the scissors mechanism, the collars, and the piercing needles of the gripping apparatus.

Vertical motion of the pivot point 100 and simultaneous horizontal motion of the pivot points 106 and 108 with respect to the frame 97 cause the needles to slide in their collars. The frame has attached to it a cylindrical stop element 99 which is a sleeve about the threaded rod 95 limiting the vertical upward motion of the pivot point 100 with respect to the frame 97 and the bracket 87. Rods 101 and 103 and solid central portion 105 of the frame 97 may act as horizontal stop elements which limit the inward horizontal travel of pivot points 106 and 108 in the slots 110. The pivot points 100, 106, and 108 will reach their respective stop elements at the same time so that all motion of the pivot points with respect to the frame will be effectively stopped. The needles will be fully extended from their collars at this point. Motion of the pivot points away from the stop elements will cause the needles to retract into the collars.

A spring 112 is provided between the bottom portion 81 of the bracket 87 and the bottom of the connecting element 99 so that a force is exerted between the connecting element and the bracket. A nut may be threaded on the threaded member 95 to vary the compression of the spring. The relationship of the spring to the rest of the structure is such that motion of the piston rod in an upward stroke causes, first, a full extension of the needles out of their collars without any lifting of the gripping apparatus, and, then, a lifting of the gripping apparatus without any further extension or retraction of the needles with respect to the collars. Motion of the piston rod in a downward stroke reverses these operations, with the gripping apparatus ending in its lowest vertical position and the needles ending in their fully retracted positions in the collars.

The piston rod 96 has a linear vertical stroke extending from an upper limit to a lower limit. Application of pressurized fluid in one direction to the cylinder and piston assembly 94 causes the piston rod 96 to move upwardly from its lower limit to its upper limit. At the lower limit, the needles are fully retracted into their respective collars and the frame 97, the bracket 87, and the apparatus the frame and bracket support are at their lowest vertical level, ideally where the needles are poised to pick up a seedling in a container or in a position where it has just dropped off a seedling in a container. The top 79 of the bracket 87 bears against the top surface 83a of the bracket 83 and the top surface 85a of the mounting structure. The spring is under maximum compression in this situation between the bottom 81 of the bracket 87 and the lower end of the connecting element 93. At the upper limit, the needles are fully extended from the collars and the frame and the apparatus it supports are raised to their highest vertical level, ideally in a position which has raised a seedling impaled on the needles clear of its container high enough so that the seedling can be moved to another container. At the upper limit, the top 79 of the bracket 87 is spaced away from the bracket 83 and the mounting structure 85. The spring is in its least compressed state.

As the piston rod begins its motion from its lower limit toward its upper limit, vertical motion of the piston rod causes the needles to be pushed out of the collars away from their retracted positions to their extended positions, for gripping a seedling positioned appropriately near the gripping apparatus. During this extension of the needles, the frame 97 and bracket 87 remain stationary with respect to the mounting member 85 and the spring relaxes from its fully compressed state. When the needles have been fully extended from the collars, pivot points 100, 106, and 108 have traveled toward and reached their respective stopping elements described above. The spring has reached its least compressed state. Further upward motion of the piston rod causes the entire frame 97, bracket 87, pivot points 100, 106, and 108, scissors mechanism, collars, and needles to be raised vertically, along with any seedling which has been gripped by the needles.

Downward motion of the piston rod from its upper limit toward its lower limit, caused by the application of fluid to the cylinder and piston assembly 94 in a direction opposite to that which produced upward motion, reverses the upward motion process of the piston rod and the gripping apparatus described above.

The position of the scissors mechanism, collars, and needles may be adjusted by means of the scissors mechanism's connection to threaded members 114 and 116 which are connected to the pivot points 106 and 108 and by means of the collars, and needles' connection to a threaded member 118 screwed into a support 120 which is a part of the frame 97.

Although it is not shown in FIGS. 4a–4d, a proximity sensor may be associated with the gripping apparatus of those FIGS. in the manner and for the purposes described above.

Figure 5A:
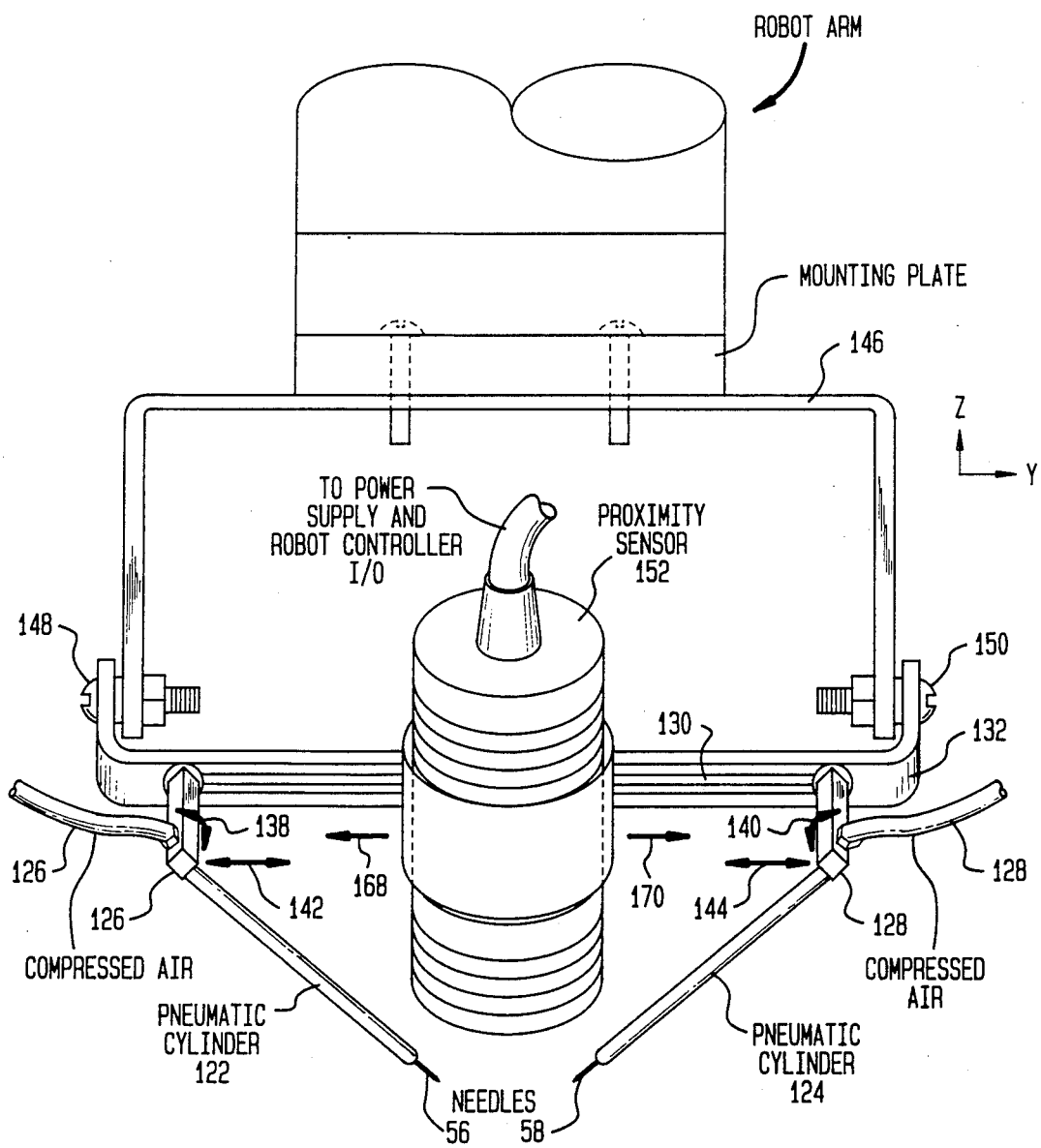
FIGS. 5a and 5b are front and side views, respectively, of an example of a gripping apparatus in accordance with the invention of this application having a pair of needles, each of the needles being driven by a separate actuator and having adjustable needle and sensor positions and orientations.
Figure 5B:
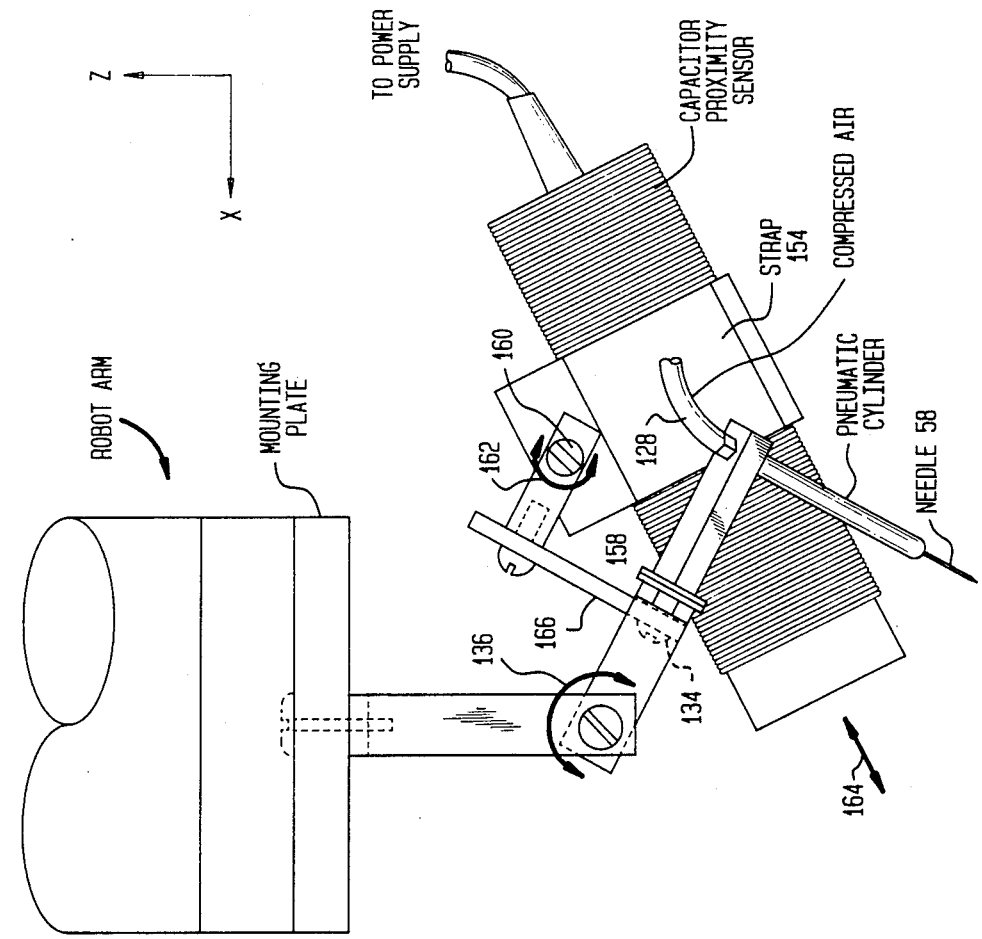

FIGS. 5a and 5b deal with a gripping apparatus in which the orientation of the needles and the proximity sensor may be conveniently adjusted to accommodate the requirements of a variety of tasks. Another aspect of the apparatus of FIGS. 5a and 5b is separate actuators for each of the needles.

Each of the needles 56 and 58 may be attached to the piston rod of a respective cylinder and piston assembly 122 or 124, which may be one of the Clippard pneumatic cylinders identified above, in any conventional fashion. For example, the needles may be welded to their respective piston rods or the needles may be screwed to their respective piston rods via complementary screw threads on the needles and piston rods. Alternatively, the piston rods themselves may be machined into needles of a desired configuration. The cylinders themselves may act as the previously described collars about the needles, if the dimensions of the needles and the cylinders are such that sufficient parts of the needles are enclosed by the cylinders when the needles are retracted into the cylinders in their open positions. Otherwise, cylindrical collars having appropriate dimensions may be attached to the ends of the cylinders through which the needles extend, so that sufficient portions of the needles are covered when the needles are retracted.

Each of the pneumatic cylinders in FIGS. 5a and 5b is connected to a compressed air supply via lines 126 and 128. The compressed air supply can be arranged so that the needles are simultaneously extended and retracted, or the compressed air supply to each of the pneumatic cylinders may be separately controlled so that the extension and retraction of the needles can be separately controlled when simultaneous action is not desired.

The pneumatic cylinders 122 and 124 are fixed to spacing blocks 126 and 128. One end of each of the spacing blocks 126 and 128 is bolted to an elongated slot 130 machined in a U-shaped metal bracket 132. Tightening of the bolts 134, one of which is shown in FIG. 5b, permits the cylinders to be locked in place at a selected angular orientation and horizontal location (y-axis coordinate). Loosening of the bolts permits the cylinders to be adjusted angularly as indicated by arrows 138 and 140 and horizontally as indicated by arrows 142 and 144.

The lengths of the spacing blocks are substantially the same. The cylinders 122 and 124 are attached to the same relative locations on their respective spacing blocks so that the lines of elongation of the cylinders 122 and 124 are substantially coplanar. The spacing blocks may be of different lengths or the cylinders may be attached to the spacing blocks at different relative locations in certain situations so that the cylinders and needles are spaced unequal distances from the bracket 132 and thus not in the same plane. This requirement may be dictated by the size or shape of the object to be picked up. Any known mechanical arrangement, such as one or more washers, may be used to make adjustable the distance between each of the cylinders and the bracket 132.

Regardless of the distance between the cylinders and the bracket 132 and regardless of whether or not the lines of elongation of the cylinders are coplanar, there is either at least one plane containing the lines of elongation of the needles, or at least one plane in which projections of the lines of elongation of the needles are in that plane. The lines of elongation form an angle such that the needles approach the vertex of the angle, or the projections of the needles in the plane approach the vertex of the angle, when the needles move from their open retracted position to their closed gripping position.

The bracket 132 is connected to a U-shaped bracket 146 by way of nut and bolt assemblies 148 and 150. These assemblies may be tightened to lock the bracket 132 with respect to the bracket 146 or loosened to adjust angular position of the bracket 132 with respect to the bracket 146, as illustrated by the arrow 136 in FIG. 5b. Adjusting the angular position of bracket 146 allows the angle of the cylinders with respect to a predetermined plane, such as a vertical plane, to be set at desired values. In other words, the angle of the lines of elongation of the cylinders with respect to y-z planes may be adjusted.

A sensor 152 like the ones described above is supported by a strap 154 which is bolted to a support member 158. The strap and supported sensor are rotatable about the axis passing through bolt 160, as illustrated by the arrow 162. Loosening the bolt 160 allows the angle of the sensor with respect to x-y planes to be adjusted. It also causes the strap to be loosened around the sensor, which permits the position of the sensor in the direction indicated by arrow 164 to be adjusted. Tightening bolt 160 fixes the sensor in place with respect to the strap. As shown in FIG. 5b, the support 158 is bolted to another support 166 which may be permanently fixed to the bracket 132 or it may be connected to the bracket 132 in the same manner that the pneumatic cylinders and spacing blocks are connected to the bracket 132. In the second case, the sensor and strap may be slid along the slot 130 so that the horizontal position of the sensor may be adjusted, as indicated by arrows 168 and 170.

An arrangement like the one of FIGS. 5a and 5b permits the positions and orientations of the piercing elements and sensor to be set so that grasping and releasing operations and sensor function may be optimized for a particular task involving special objects of unusual size and shape, as well as more conventionally sized and shaped objects.

There may be many variations on the themes presented in the drawings in this application. For example, there may be more than two piercing elements, more than one or two actuators, and more than one sensor. There may be a different kind of manipulator or the gripping apparatus may be attached to a fixed structure and the object to be grasped may be brought to the gripping apparatus. There are other possibilities within the scope of the claims set forth below.

We claim:

1. An apparatus for gripping an object, comprising:
a first elongated gripping element which is movable along a first line between a first retracted position and a second gripping position and which is capable of piercing an object to be gripped;
a second elongated gripping element which is spaced a predetermined distance from the first gripping element, which is movable along a second line which is not parallel to the first line between a first retracted position and a second gripping position, and which is capable of piercing an object to be gripped;
the first and second gripping elements being arranged such that the distance between the first and second gripping elements decreases when either one or both of the gripping elements is moved from their respective first retracted positions to their respective gripping positions;
means for selectively moving the first and second gripping elements between their respective first retracted positions and their respective second gripping positions;
a scissors mechanism between the moving means and the first an second gripping elements which renders the moving means capable of simultaneously moving the first and second gripping elements between their respective first retracted positions and their respective second gripping positions; and
a sensor which is attached to said apparatus such that said sensor is positioned within an area defined by said gripping elements and said moving means so as to sense the presence of a plant being grasped.

2. The gripping apparatus of claim 1, further comprising:
a collar means into which the first and second gripping elements are retracted when in their respective retracted positions.

3. The gripping apparatus of claim 1, in which the first and second gripping elements each comprises a needle capable of piercing an object and holding it when the first and second gripping elements are in their respective second gripping positions.

4. The gripping apparatus of claim 3, further comprising:
a means for forcing the needles to withdraw from an object when the needles are moved to their respective retracted positions.

5. The gripping apparatus of claim 4, in which the forcing means comprises:
a collar means into which the needles retract when they are moved to their respective second retracted positions.

6. The gripping apparatus of claim 1, in which the gripping elements are substantially coplanar.

7. The gripping apparatus of claim 6, in which the plane containing the gripping elements is slanted at a predetermined angle with respect to a predetermined plane.

8. The gripping apparatus of claim 7, in which the angle is in the range of about 0 degrees to about 80 degrees with respect to a vertical plane.

9. The apparatus of claim 8, further comprising:
a means for adjusting the angle of the plane with respect to a predetermined plane.

10. The gripping apparatus of claim 1, in which the angle between the gripping elements is in the range of about 20 degrees to about 90 degrees.

11. The apparatus of claim 10, further comprising:
a means for adjusting the angle of the gripping elements with respect to each other.

12. The apparatus of claim 1, further comprising first and second actuators connected to the first and second gripping elements.

13. The apparatus of claim 1, further comprising a single actuator connected to the first and second gripping elements.

14. The apparatus of claim 13, further comprising a means for translating motion produced by the single actuator to the motion of the first and second gripping elements between retracted and gripping positions and to motion of the gripping elements which raise and lower an object pierced by the gripping elements.

15. A transplanting apparatus comprising:
(a) a gripping means, comprising
(1) a first elongated gripping element movable along a first line between a first retracted position and a second gripping position in which the first gripping element is capable of piercing a root mass of a plant to be transplanted;

(2) a second elongated gripping element spaced a predetermined distance from the first gripping element and movable along a second line which is not parallel to the first line between a first retracted position and a second gripping position in which the second gripping element is capable of piercing the root mass of a plant to be transplanted;

the first and second gripping elements being arranged such that the distance between the first and second gripping elements decreases when either one or both of the gripping elements is moved from their respective first retracted positions to their respective second gripping positions;

(b) a means for supporting the gripping means in a predetermined orientation with respect to a first location having plants to be transplanted and with respect to a second location to which plants are to be transplanted;

(c) a means for moving the gripping means between the fist and second locations;

(d) a means for selectively moving the first and second gripping elements between their respective first retracted positions and their respective second gripping positions;

(e) a scissors mechanism between the moving means and the first and second gripping elements which renders the moving means capable of simultaneously moving the first and second gripping elements between their respective first retracted positions and their respective second gripping positions; and (f) a sensor which is attached to said transplanting apparatus such that said sensor is positioned within an area defined by said gripping elements and said means for moving said gripping elements so as to sense the presence of a plant being gripped.

16. The apparatus of claim 15, further comprising:
a collar means into which the first and second gripping elements are retracted when in their respective retracted positions.

17. The apparatus of claim 15, in which the first and second gripping elements each comprises a needle capable of piercing an object and holding it when the first and second gripping elements are in their respective second gripping positions.

18. The apparatus of claim 17, further comprising:
a means for forcing the needles to withdraw from an object when the needles are moved to their respective retracted positions.

19. The apparatus of claim 18, in which the forcing means comprises:
a collar means into which the needles retract when they are moved to their respective second retracted positions.

20. The apparatus of claim 15, in which the gripping elements are substantially coplanar.

21. The apparatus of claim 20, in which the plane containing the gripping elements is slanted at a predetermined angle with respect to a predetermined plane.

22. The apparatus of claim 21, in which the angle is in the range of about 0 degrees to about 80 degrees with respect to a vertical plane.

23. The apparatus of claim 22, further comprising:
a means for adjusting the angle of the plane with respect to a predetermined plane.

24. The apparatus of claim 15, in which the angle between the gripping elements is in the range of about 20 degrees to about 90 degrees.

25. The apparatus of claim 24, further comprising:
a means for adjusting the angle of the gripping elements with respect to each other.

26. A gripping apparatus, comprising:
a first elongated gripping element movable along a first line between a first retracted position and a second gripping position in which the first gripping element is capable of piercing an object to be gripped;

a second elongated gripping element movable along a second line between a first retracted position and a second gripping position in which the second gripping element is capable of piercing an object to be gripped.

the first and second liens defining an angle in at least one plane;

and the first and second gripping elements being arranged such that they approach the vertex of the angle as they are moved with from their respective first retracted positions to their respective second gripping positions; a means for selectively moving the first and second gripping elements between their respective first retracted positions and their respective second gripping positions; a scissors mechanism between the moving means and the first and second gripping elements which renders the moving means capable of simultaneously moving the first and second gripping elements between their respective first retracted positions and their respective second gripping positions; and a sensor which is attached to said apparatus such that said sensor is positioned within an area defined by said gripping elements and said moving means so as to sense the presence of a plant being grasped.

27. The apparatus of claim 26, further comprising:
a collar means into which the first and second gripping elements are retracted when in their respective retracted positions.

28. The apparatus of claim 26, in which the first and second gripping elements each comprises a needle capable of piercing an object and holding it when the first and second gripping elements are in their respective second gripping positions.

29. The apparatus of claim 28, further comprising:
a means for forcing the needles to withdraw from an object when the needles are moved to their respective retracted positions.

30. The apparatus of claim 29, in which the forcing means comprises:
a collar means into which the needles retract when they are moved to their respective second retracted positions.

31. The apparatus of claim 26, in which the gripping elements are substantially coplanar.

32. The apparatus of claim 31, in which the plane containing the gripping elements is slanted at a predetermined angle with respect to a predetermined plane.

33. The apparatus of claim 32, in which the angle is in the range of about 0 degrees to about 80 degrees with respect to a vertical plane.

34. The apparatus of claim 33, further comprising:
a means for adjusting the angle of the plane with respect to a predetermined plane.

35. The apparatus of claim 26, in which the angle between the gripping elements is in the range of about 20 degrees to about 90 degrees.

36. The apparatus of claim 35, further comprising:
a means for adjusting the angle of the gripping elements with respect to each other.

37. A gripping apparatus, comprising:
a first elongated gripping element movable along a first line between a first open position and a second gripping position in which the first gripping element is capable of piercing an object to be gripped;
a second elongated gripping element movable along a second line between a first open position and a second gripping position in which the second gripping element is capable of piercing an object to be gripped;
projections of the first and second liens defining an angle in at least one plane; projections of the first and second elements in the plane moving toward the vertex of the angle when the first and second elements are moved from their respective open positions to their respective gripping positions; a means for selectively moving the first and second gripping elements between their respective first retracted positions and their respective second gripping positions; a scissors mechanism between the moving means and the first and second gripping elements which renders the moving means capable of simultaneously moving the first and second gripping elements between their respective first retracted positions and their respective sound gripping positions; and a sensor which is attached to said apparatus such that said sensor is positioned within an area defined by said gripping elements and said moving means so as to sense the presence of a plant being grasped.

38. The apparatus of claim 37, further comprising:
a collar means into which the first and second gripping elements are retracted when in their respective retracted positions.

39. The apparatus of claim 37, in which the first and second gripping elements each comprises a needle capable of piercing an object and holding it when the first and second gripping elements are in their respective second gripping positions.

40. The apparatus of claim 39, further comprising:
a means for forcing the needles to withdraw from an object when the needles are moved to their respective retracted positions.

41. The apparatus of claim 40, in which the forcing means comprises:
a collar means into which the needles retract when they are moved to their respective second retracted positions.

42. The apparatus of claim 37, in which the gripping elements are substantially coplanar.

43. The apparatus of claim 42, in which the plane containing the gripping elements is slanted at a predetermined angle with respect to a predetermined plane.

44. The apparatus of claim 43, in which the angle is in the range of about 0 degrees to about 80 degrees with respect to a vertical plane.

45. The apparatus of claim 44, further comprising:
a means for adjusting the angle of the plane with respect to a predetermined plane.

46. The apparatus of claim 37, in which the angle between the gripping elements is in the range of about 20 degrees to about 90 degrees.

47. The apparatus of claim 46, further comprising:
a means for adjusting the angle of the gripping elements with respect to each other.

* * * * *

UNITED STATES PATENT AND TRADEMARK OFFICE
CERTIFICATE OF CORRECTION

PATENT NO. : 5,054,831

DATED : Oct. 8, 1991

INVENTOR(S) : Ting et al.

It is certified that error appears in the above-identified patent and that said Letters Patent is hereby corrected as shown below:

```
Column  8, line  8, after "arrow", insert --38--.
Column 14, line  6, "an" should read --and--.
Column 15, line 25, "fist" should read --first--.
Column 16, line 20, "liens" should read --lines--.
Column 16, line 24, cancel the word "with".
Column 17, line 17, "liens" should read --lines--.
Column 17, line 31, "sound" should read --second--.
```

Signed and Sealed this

Thirteenth Day of April, 1993

Attest:

STEPHEN G. KUNIN

*Attesting Officer*  *Acting Commissioner of Patents and Trademarks*